May 20, 1969 WOLF-DIETER BENSINGER ET AL 3,444,842
ROTARY PISTON INTERNAL COMBUSTION ENGINE
Filed Oct. 3, 1967 Sheet 1 of 2

INVENTORS
WOLF-DIETER BENSINGER
KARL-WALTER SCHMIDT

BY *Craig e Antonelli*

ATTORNEYS

United States Patent Office 3,444,842
Patented May 20, 1969

3,444,842
ROTARY PISTON INTERNAL COMBUSTION ENGINE
Wolf-Dieter Bensinger, Stuttgart-Riedenberg, and Karl-Walter Schmidt, Rommelshausen, Germany, assignors to Daimler-Benz Aktiengesellschaft, Stuttgart-Unterturkheim, Germany
Filed Oct. 3, 1967, Ser. No. 672,515
Claims priority, application Germany, Oct. 6, 1966, D 51,253
Int. Cl. F02b 55/04
U.S. Cl. 123—8                    20 Claims

ABSTRACT OF THE DISCLOSURE

A rotary piston internal combustion engine particularly of trochoidal construction in which a piston is rotatably supported on the eccentric of an eccentric shaft so as to rotate relative to the eccentric and to the housing, and which includes drive mechanism spaces within the area of the hub of the piston on both sides thereof; the engine is further provided with an annular space open in the direction toward the respective drive mechanism space at one or both sides of the piston within the area of its hub, whereby each annular space is subdivided into several individual partial spaces by means of walls; the free ends of the walls subdividing the annular space into individual partial spaces extending approximately tangentially opposite the direction of rotation of the piston with the wall surfaces thereof trailing in relation to the direction of rotation of the piston; a collecting screen which is secured to the eccentric shaft, is arranged within the area of the associated end wall of the eccentric to collect the oil leaving the partial spaces, and in its turn, conducts the thus-collected oil substantially in the axial direction of the internal combustion engine out of the respective drive mechanism space.

Background of the invention

The present invention relates to a rotary piston internal combustion engine, especially to an internal combustion engine of trochoidal construction, provided with a piston so arranged on the eccentric of an eccentric shaft as to rotate relative thereto and to the housing, and with drive mechanism spaces provided on both sides within the area of the hub of the piston.

With rotary piston internal combustion engines of trochoidal construction, considerable difficulties are encountered to lead off or conduct away the oil leaving the bearings of the eccentric shaft in the housing and leaving the bearing of the piston on the eccentric shaft, which oil is possibly utilized also for purposes of cooling the piston, in a rapid and safe manner out of the drive mechanism or transmission space on both sides of the piston in order to achieve a relief of the oil seals.

Summary of the invention

The present invention, for purposes of relieving the oil seals, aims at realizing the discharge of the oil out of the drive mechanism spaces with better success than heretofore. The underlying problems are solved in accordance with the present invention in that at one or at both sides of the piston there is provided within the area of its hub an annular space open in the direction toward the drive mechanism or transmission space which, for purposes of collecting the oil, is subdivided by means of walls into individual partial spaces whereby the free ends of the walls extend with the wall surfaces thereof trailing in relation to the direction of rotation of the piston approximately tangentially in a direction opposite the direction of rotation of the piston for the purpose of centrifuging or throwing out the oil and a collecting screen for oil leaving the partial spaces is provided within the area of the associated end wall of the eccentric of the eccentric shaft which conducts away the collected oil in the axial direction of the internal combustion engine out of the drive mechanism or transmission space.

Lubricating oil and possibly cooling oil is collected in the partial spaces and is retained therein for such length of time until it is thrown out or centrifuged out of the partial spaces within the area of the lower piston dead-center point, is collected by the collecting screen and is conducted away by the latter. The resulting velocity of the thrown out oil is directed opposite to the movement of the collecting screen secured at the eccentric. Since the collecting screen, by reason of its fastening at the eccentric, rotates with the rotational speed of the eccentric shaft and therefore rotates more rapidly than the piston, the thrown-out oil is safely collected and is conducted toward the outside by the collecting screen. It is avoided thereby that the oil remains permanently in the drive mechanism or transmission spaces. Additionally, the oil seals are relieved.

According to a further feature and construction of the present invention, with a rotary piston internal combustion engine having an annular space provided at a piston side which is subdivided by means of walls into individual spaces, chambers separated from each other in any conventional manner may be arranged on the inside of the piston which are in communication at the one piston side with the partial spaces by way of bores which discharge in the partial spaces radially outwardly at the leading corners in relation to the direction of rotation of the piston, and the chambers may be connected at the other piston side by way of bores with the drive mechanism or transmission space whereby the bores discharge radially inwardly into the trailing parts of the chambers.

With such an arrangement according to the present invention, a safe and reliable discharge of the accumulated oil out of both drive mechanism spaces is achieved notwithstanding the subdivision of only one annular space into partial spaces and correspondingly the provision of only one collecting screen because the oil is conducted from one drive mechanism or transmission space through the piston in the direction to the other drive mechanism or transmission space into the partial spaces and is conducted away from there laterally. In case of need, the oil conducted through the piston may also be utilized to cool the piston itself.

Advantageously, the walls may be provided with discharge edges which are disposed on a circle about the center longitudinal axis of the piston, and the trailing wall surfaces of the walls may be disposed within the area of the discharge edges tangentially to this circle whereby an accurate centrifuging or throwing-out of the oil in a tangential direction toward the collecting screen is achieved.

The walls may be curved blade-like in a structurally simple manner. However, they may also possess a circularly curved shape. The collecting screen secured at the eccentric may project in the axial direction into the bearing bore within the lateral part of the housing of the internal combustion engine so that oil when leaving the collecting screen cannot reach again the drive mechanism or transmission space.

In order not to lose any oil, the collecting screen may be provided at its end disposed opposite the direction of rotation of the eccentric shaft with an extension bent in the direction toward the eccentric shaft. Furthermore, the collecting screen may be curved in a structurally simple manner along a circle about the center longitudinal axis of the eccentric shaft.

Accordingly, it is an object of the present invention to provide a rotary piston internal combustion engine of the type described above which eliminates the shortcomings and drawbacks encountered heretofore in the prior art by simple means.

Another object of the present invention resides in a rotary piston internal combustion engine which eliminates the difficulties encountered heretofore in assuring a safe and reliable discharge of the lubricating oil from the various bearings of the engine, and in particular from the bearings of the eccentric shaft in the housing and of the piston on the eccentric shaft.

A further object of the present invention resides in a rotary piston internal combustion engine of troichoidal construction which not only assures a reliable and rapid discharge of the oil from the various bearings but additionally permits the utilization of the oil for purposes of cooling the piston while at the same time effectively relieving the oil seals of the engine.

A still further object of the present invention resides in a lubrication circulatory system for the bearings of rotary piston internal combustion engine which assures a significant relief of the oil seals provided in the space between the piston end walls and the housing side walls of the engine.

Another object of the present invention resides in a rotary piston internal combustion engine provided with a lubricating system for the bearings which makes sure that the oil does not remain permanently in the bearings.

A further object of the present invention resides in a rotary piston internal combustion engine which achieves the aforementioned aims and objects by simple structural means.

These and further objects, features, and advantages of the present invention will become more obvious from the following description when taken in connection with the accompanying drawing which shows, for purposes of illustration only, one embodiment in accordance with the present invention, and wherein.

Figure 1:
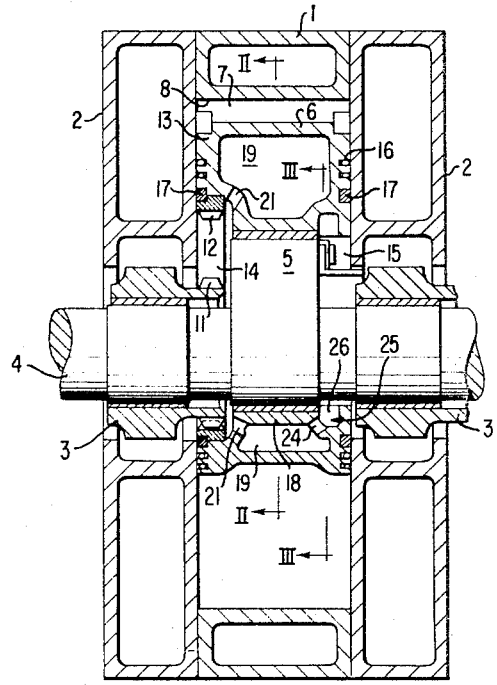
FIGURE 1 is an axial longitudinal cross-sectional view through a rotary piston internal combustion engine of trochoidal construction in accordance with the present invention.
Figure 2:
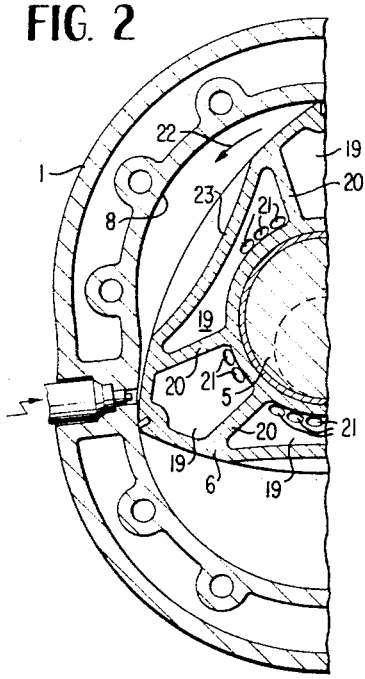
FIGURE 2 is a partial cross-sectional view through the internal combustion engine taken along line II—II of FIGURE 1.
Figure 3:
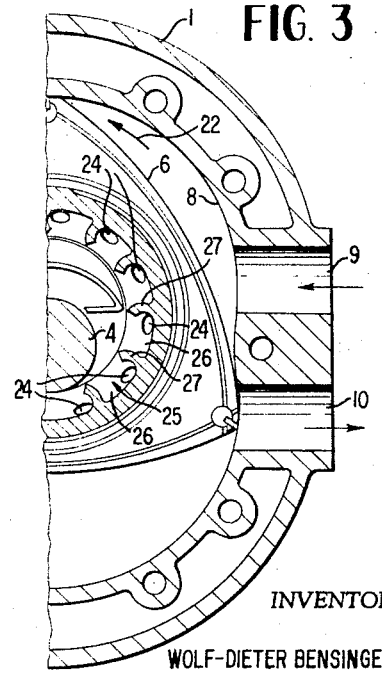
FIGURE 3 is a partial cross-sectional view taken along line III—III of FIGURE 1.

Referring now to the drawing wherein like reference numerals are used throughout the various views to designate like parts, and more particularly to FIGURES 1 to 3, the internal combustion engine illustrated therein comprises a casing 1 with laterally affixed side parts 2. The eccentric shaft 4 with the eccentric 5 is rotatably supported in the side parts 2 within the bearings 3. The piston 6 which is journalled on the eccentric 5, rotates relative to the eccentric shaft 4 and to the housing and slides with the sealing bars 7 provided at its corners along the inner case surface 8 of the casing 1 and thereby valves both the inlet 9 as well as the outlet 10.

The rotation of the piston 6 is controlled by the pinion 11 secured concentrically to the eccentric shaft 4 at a housing side part 2 and by the hollow gear 12 meshing with the pinion 11 which is secured at the end wall 13 of the piston 6.

Within the area of the transmission constituted by the pinion 11 and the hollow gear 12 the drive mechanism or transmission space 14 (FIG. 1) is present between the eccentric 5 and the one side part 2. On the other side of the piston 6 the drive mechanism or transmission space 15 (FIG. 1) is located between the eccentric 5 and the other housing side part 2. In order that oil, which leaves or escapes out of the bearings 3 of the eccentric shaft 4 and out of the bearing of the piston 6 on the eccentric 5, cannot flow outwardly in the radial direction between the piston 6 and the side parts 2, oil seals 17 are arranged in the end wall 13 of the piston 6 and in the end wall 16 disposed on the other piston side. Since the oil rotates in the drive mechanism spaces 14 and 15 in a sickle-like manner corresponding to the effective centrifugal forces, the pressure on the oil seals is relatively large, particularly when a vacuum prevails in the working spaces of the internal combustion engine.

Chambers 19 are arranged on the inside of the piston 6 about the hub 18 thereof which are separated from one another by the walls 20. For the purpose of cooling the piston, the chambers 19 are supplied with oil from the drive mechanism space 14 which enters by way of bores 21. The discharge orifices of the bores 21 in the chambers 19 are disposed in relation to the direction of rotation 22 of the piston 6 always in the trailing portion of the chambers 19 so that the oil moves along under the influence of the effective centrifugal forces at the respective trailing wall 20 of a chamber 19, then on the inside along the piston flank 23 and subsequently at the respective leading wall 20 and absorbs heat.

The oil reaches from the chambers 19 by way of bores 24, which start at the leading portions of the chambers 19, the annular space generally designated by reference numeral 25 disposed on the other side of the piston 6 adjacent the hub 18. This annular space 25, which is open in the direction toward the drive mechanism space 15, consists of a large number of partial spaces 26 (FIGS. 3 and 4) which are separated from one another by the walls 27. The arrangement is thereby so made that the bores 24 terminate in the leading outer corners of the partial spaces 26. The walls 27 are, as can be readily seen from FIGURE 4, curved blade-like opposite the direction of rotation 22 of the piston 6 in such a manner that the discharge edges 28 are disposed on a circle 29 about the center longitudinal axis 30 of the piston 6 or the eccentric 5 and that the curved surfaces of the walls 27 are disposed within the area of the discharge edges tangentially to this circle 29.

The collecting screen 31 (FIG. 4) is secured at the eccentric 5 in any conventional manner and is curved according to a circle 32 about the center longitudinal axis 33 of the eccentric shaft 4. The diameter of the circle 32 is slightly smaller than the diameter of the circle 29. At its end, disposed opposite the direction of rotation of the eccentric shaft (corresponding to the direction of rotation 22 of the piston 6), the collecting screen 31 is provided with the extension 34 which is directed toward the eccentric shaft 4.

Figure 4:
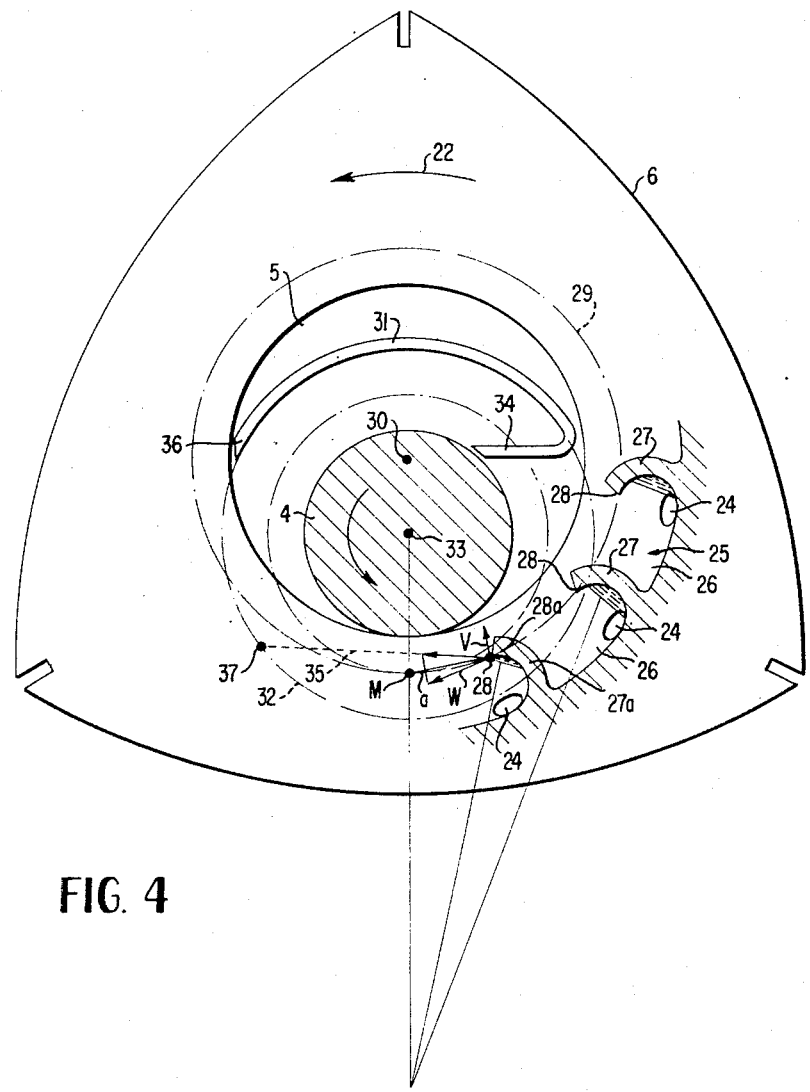
FIGURE 4 is a schematic cross-sectional view corresponding to FIGURE 3 but on an enlarged scale.

Oil, which reaches the partial spaces 26 from the chambers 19 by way of the bores 24, collects in the recesses or pockets of the blade-like curved walls 27, and is taken along by the piston 6 during rotation thereof in the direction of arrow 22. The oil begins to leave the recesses of the blade-like curved walls 27 only at a predetermined place, and more particularly at that time when a wall 27 is in its position indicated by reference numeral 27a (FIG. 4). The direction and velocity of the discharged oil is determined by the two vectors $v$ and $w$. The vector $v$ represents the velocity of the discharge edge 28a at the wall 27a of the piston while the vector $w$ indicates the direction of the circulating oil. The vector $v$ is realized as perpendicular to the connecting line $a$ leading to the moment point M which, according to FIGURE 1, is determined by the engagement of the hollow gear 12 at the pinion 11. The vector $w$ is determined by the curvature of the wall 27a. The oil is thrown out or discharged from the discharge edge 28a in the direction of the line 35. The resultant velocity of the oil is directed opposite to the movement of the collecting screen 31 securely fastened at the eccentric 5, and since the collecting screen 31 intersects with its forward end 36 the line 35 at the point 37, due to the fact that the eccentric shaft 4 rotates three times as fast as the piston 6, before the thrownout or discharged oil reaches his point 37, the oil is collected by the collecting screen 31. In order that the oil does not leave at the end of the collecting screen 31, it is retained by the extension 34 and conducted into the side part 2.

The free ends of the walls 27 or the trailing wall surfaces thereof, may deviate slightly from the tangential direction. Important is only their position opposite the direction of rotation of the piston. The most favorable direction depends from the diameter of the circle of action (circle 32) of the collecting screen 31, from the diameter of the circle 29 on which are disposed the discharge edges of the walls 27 and from the eccentricity, i.e., the distance of the axis 30 from the axis 33.

The collecting screen 31 need not be curved. Only the position of the forward end 36 and its sack-like connection between the same and the eccentric shaft 4 are important. The circle of action of the forward end 36 of the collecting screen 31 is to be as large as possible whereas the forward end is to be disposed as close as possible to the wall 27 from which the collected oil is thrown out or discharged.

While we have shown and described one embodiment in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. A rotary piston internal combustion engine, especially of trochoidal construction which includes a piston rotatingly arranged on the eccentric of an eccentric shaft so as to rotate relative thereto and to the engine housing, and which is provided within the area of the hub of the piston on both sides thereof with drive mechanism spaces, wherein the improvement comprises annular space means provided at least on one side of the piston within the area of its hub and open in the direction to the respective drive mechanism space, said annular space means being subdivided into individual partial spaces by wall means with free ends for collecting oil, the free ends of the wall means extending—for purposes of discharging oil—with the trailing wall surfaces thereof in relation to the direction of rotation of the piston approximately tangentially and opposite the direction of rotation of the piston, and collecting screen means provided within the area of the associated end wall of the eccentric of the eccentric shaft for catching the oil leaving the partial spaces and for conducting away the collected oil from the respective drive mechanism space.

2. An internal combustion engine according to claim 1, wherein said screen means conducts away the oil from the respective drive mechanism space substantially in the axial direction.

3. An internal combustion engine according to claim 1, wherein chambers are provided on the inside of the piston which are separated from one another and are in communication with the partial spaces at the one piston side by way of bore means, said bore means discharging in the partial spaces radially outwardly at the leading corners in relation to the direction of rotation of the piston, and said chambers being operatively connected at the other piston side by way of further bore means with the drive mechanism space located on the other side, said further bore means terminating radially inwardly in the trailing portions of the chambers.

4. An internal combustion engine according to claim 3, wherein the wall means of the individual partial spaces are provided with discharge edges, disposed substantially on a circle about the longitudinal axis of the piston, and the trailing wall surfaces of said wall means extend within the area of the discharge edges substantially tangentially to this circle.

5. An internal combustion engine according to claim 4, wherein said wall means are curved in a blade-like manner.

6. An internal combustion engine according to claim 4, wherein said wall means are curved in the shape of a circular arc.

7. An internal combustion engine according to claim 4, wherein said collecting screen means is rigidly secured at the eccentric and projects in the axial direction into the bearing bore provided within the side part of the housing of the internal combustion engine.

8. An internal combustion engine according to claim 7, wherein said collecting screen means is provided at its end disposed opposite the direction of rotation of the eccentric shaft with an extension bent in the direction toward the eccentric shaft.

9. An internal combustion engine according to claim 8, wherein the collecting screen means is curved substantially about a circle about the longitudinal center axis of the eccentric shaft.

10. An internal combustion engine according to claim 9, wherein said wall means are curved in a blade-like manner.

11. An internal combustion engine according to claim 9, wherein said wall means are curved in the shape of a circular arc.

12. An internal combustion engine according to claim 1, wherein the wall means of the individual partial spaces are provided with discharge edges, disposed substantially on a circle about the longitudinal axis of the piston, and the trailing wall surfaces of said wall means extend within the area of the discharge edges substantially tangentially to this circle.

13. An internal combustion engine according to claim 12, wherein the collecting screen means is curved substantially about a circle about the longitudinal center axis of the eccentric shaft.

14. An internal combustion engine according to claim 13, wherein said collecting screen means is rigidly secured at the eccentric and projects in the axial direction into the bearing bore provided within the side part of the housing of the internal combustion engine.

15. An internal combustion engine according to claim 14, wherein said collecting screen means is provided at its end disposed opposite the direction of rotation of the eccentric shaft with an extension bent in the direction toward the eccentric shaft.

16. An internal combustion engine according to claim 1, wherein said collecting screen means is rigidly secured at the eccentric and projects in the axial direction into the bearing bore provided within the side part of the housing of the internal combustion engine.

17. An internal combustion engine according to claim 16, wherein said collecting screen means is provided at its end disposed opposite the direction of rotation of the eccentric shaft with an extension bent in the direction toward the eccentric shaft.

18. An internal combustion engine according to claim 17, wherein the collecting screen means is curved substantially about a circle about the longitudinal center axis of the eccentric shaft.

19. An internal combustion engine according to claim 1, wherein said collecting screen means is provided at its end disposed opposite the direction of rotation of the eccentric shaft with an extension bent in the direction toward the eccentric shaft.

20. An internal combustion engine according to claim 1, wherein the collecting screen means is curved substantially about a circle about the longitudinal center axis of the eccentric shaft.

References Cited

UNITED STATES PATENTS 3,213,837  10/1965  Keylwert.

FOREIGN PATENTS 1,287,320  2/1962  France.
1,196,914  7/1965  Germany.

ROBERT M. WALKER, *Primary Examiner.*

L. H. GERIN, *Assistant Examiner.*

U.S. Cl. X.R.

230—210